United States Patent

Stewart et al.

[15] 3,652,202
[45] Mar. 28, 1972

[54] PRODUCTION OF SODIUM CARBONATE

[72] Inventors: Dorothy Ann Stewart; Bernard Allen Maloney, both of Corpus Christi, Tex.

[73] Assignee: PPG Industries, Inc., Pittsburgh, Pa.

[22] Filed: Mar. 12, 1969

[21] Appl. No.: 806,690

[52] U.S. Cl. ...................................................23/63, 204/87
[51] Int. Cl. ........................................C01d 7/00, C01b 31/24
[58] Field of Search ..........................................23/63; 204/87

[56] References Cited

UNITED STATES PATENTS

| 2,346,140 | 4/1944 | Pike | 23/63 |
| 2,861,867 | 11/1958 | Hirsch | 23/63 |
| 3,212,848 | 10/1965 | Tasiaux | 23/63 |
| 3,259,471 | 7/1966 | Cortessis et al. | 23/63 X |
| 3,459,497 | 8/1969 | Coglaiti et al. | 23/63 |

Primary Examiner—Oscar R. Vertiz
Assistant Examiner—G. Alvaro
Attorney—Chisholm and Spencer

[57] ABSTRACT

Electrolytic cell liquor (aqueous sodium hydroxide) is carbonated to produce sodium carbonate. Sodium carbonate is then separated as sodium carbonate monohydrate crystals of desirable physical properties, notably low friability and high bulk density by overcoming the adverse effect of organic impurities which are present during crystallization.

6 Claims, No Drawings

PRODUCTION OF SODIUM CARBONATE

BACKGROUND

Electrolysis of aqueous sodium chloride in a so-called chlorine-alkali diaphragm type electrolytic cell is a widely practiced commercial means by which elemental chlorine and sodium hydroxide are co-produced. In meeting rising chlorine demands there is a corresponding increase in co-product sodium hydroxide. When sodium hydroxide requirements do not coincide with the demand for chlorine, oversupply of sodium hydroxide occurs. To offset this imbalance and otherwise utilize the alkali values of sodium hydroxide, it has been proposed that the sodium hydroxide be carbonated to sodium carbonate products. A number of processes are reported in the literature for carbonating sodium hydroxide to obtain carbonate products, see by way of illustration U.S. Pat. Nos. 2,792,283, 2,842,489 and 3,321,268.

One such process carbonates aqueous sodium hydroxide solutions such as are produced in common types of electrolytic diaphragm cells. This process usually involves steps for removing sodium chloride from the aqueous sodium hydroxide solution, separating other impurities which may be present and then reacting the thus purified aqueous sodium hydroxide solution with carbon dioxide to provide a sodium carbonate. Solid sodium carbonate is then recovered from the solution. Typically, sodium carbonate monohydrate is separated from the solution by evaporative crystallization. Drying this monohydrate will convert it to sodium carbonate.

Sodium carbonate monohydrate crystals obtained by such methods tend to be unusually elongated and thin. As a consequence, the carbonate product evidences excessive friability and dustiness, a low bulk density and other less than ideal properties.

SUMMARY OF THE INVENTION

This invention deals with the preparation of high quality sodium carbonate products from electrolytic cell liquors. It more particularly concerns the manufacture of sodium carbonate monohydrate crystals of adequately high bulk density, low friability and low dustiness by the carbonation of sodium hydroxide produced by the electrolysis of sodium chloride in diaphragm electrolytic cells.

It has been discovered that organic impurities present in the electrolytic cell liquors are responsible for the formation of sodium carbonate monohydrate crystals which are too thin and elongated. Impurities exerting this effect on the carbonate crystal habit are organic in nature, notably carboxylic acids, particularly polycarboxylic acids. Specific acids which evidence such an adverse effect on the crystal habit include pyromellitic acid, linolenic, maleic as well as the chlorinated derivatives of these acids, including the chloroaromatic carboxylic acids. Oxidation of graphite (and organic impregnants such as linseed oil) in the anodes of electrolytic diaphragm cells is regarded as the source for the carboxylic acids or comparable organic contaminants which find their way into the aqueous sodium hydroxide and exert a deleterious effect on the crystal habit of the sodium carbonate monohydrate. Some of these organics believed to be in electrolytic diaphragm caustic soda include mellitic acid, pentacarboxychlorobenzene and hydroquinone.

According to this invention, carbonated cell liquor is treated prior to crystallizing therefrom sodium carbonate to obtain the sodium carbonate in a more compact crystal habit, to wit, as a denser sodium carbonate of lower friability and lower dustiness. Sodium carbonate products with these desirable properties are obtained by effectively overcoming the adverse effect of organic impurities prior to crystallizing the sodium carbonate. This may be accomplished, for example, by removing or reducing to a tolerably low level the presence of these impurities and/or by providing an overriding effect.

As had hereinbefore been pointed out, contaminants responsible for having the adverse effect on the crystal habit of sodium carbonate monohydrate are thought to be carboxylic acids, probably chlorinated polycarboxylic aromatic acids, as well as other organic oxidation products of graphite (e.g., quinones) and impregnants used in graphite anodes. Thus, the present invention is primarily concerned with the treatment of "carbonated cell liquor" from which solid sodium carbonate is recovered.

This effect on the crystal habit produced by various organics of the type whose presence in cell liquors would be expected as a consequence of oxidizing anode (graphite and impregnant) materials has been demonstrated by adding such organics to sodium carbonate solutions, crystallizing monohydrate therefrom and observing the monohydrate's crystal habit. Some of these results are as follows:

| Additive Compound | Parts per Million | Crystal Axis Ratio in 30/50 Mesh Fraction $C : a : b$ |
|---|---|---|
| Typical Control | No Additive | 1 : 1.0 : 2.3 |
| Hydroquinone | 20 | 1 : 2.5 : 10 |
| Hydroquinone | 100 | 1 : 4.1 : 10 |
| Hydroquinone | 500 | 1 : 3.1 : 11 |
| Maleic Acid | 100 | 1 : 1.3 : 5.8 |
| Sodium Linoleate | 50 | 1 : 1.9 : 16 |
| Pyromellitic Acid | 100 | 1 : 1.9 : 7.1 |
| Pyromellitic Acid | 500 | 1 : 2.5 : 11.2 |

The closer to unity the rations of $c$ axis (or crystal thickness) to both the $a$ and $b$ axes (crystals width and length), the more compact the crystal. In those tests where pyromellitic acid was added, it was noted that the actual crystal dimension (contrast to ratio of axes) along its $c$ axis was reduced by one-half to one-sixth or one-seventh, indicating influence of this acid in suppressing growth along the $c$ axis of the crystal.

Even quite low concentrations of the organic contaminant will have a significant impact upon the crystal habit.

As used herein, "cell lquor" refers to aqueous alkali metal hydroxide, the most notable of which is sodium hydroxide which has originated in an electrolytic cell. More particularly, such "cell liquors" typically have been prepared by electrolysis in an electrolytic cell containing graphite, notably and electrolytic diaphragm cell having a graphite or other carbon type anode. Graphite or like carbon anodes are treated or impregnated with organic materials which also may give rise to impurities having adverse effects.

The sodium hydroxide content of cell liquor as it leaves the cell typically is from about 10 to 15 percent by weight. Also present are considerable quantities of sodium chloride. Other salts which are found with the sodium chloride used to prepare the brine fed to the cell are apt to be present. Sodium sulfate or other sulfate impurities are the more notable of such salts.

Caustic soda removed from the cell, i.e., from the catholyte compartment, is usually then processed prior to being carbonated. Such processing is designed to remove substantial quantities of sodium chloride and other salt contaminants by a variety of physical expedients such as concentration, heating, cooling, selective crystallization, etc. Any of the well known specific steps involved in treating caustic soda cell liquors to further purify, dilute and/or concentrate them may be used in attaining the aqueous sodium hydroxide solutions which are carbonated, typically by the use of boiler flue gas or other cheap carbon dioxide.

Materials useful in overcoming the adverse effect exhibited by the hereinbefore described organic materials on the crystal habit of sodium carbonate monohydrate can be of widely different nature, both physically and chemically. They may even function differently. They are thought to function by absorbing, and/or occluding or otherwise extracting the undesirable contaminant from solution or by converting it to a form which either favors or dies not interfere with formation of the proper crystal habit.

Pursuant to one embodiment of this invention, an attapulgite type clay is used to overcome the adverse effect of the undesirable organic contaminant and hence make it possible to obtain the desired sodium carbonate crystal habit. This treatment entails contacting the carbonated cell liquor solution with the clay. Simply mixing or dispersing the clay in the solution suffices. Passing the solution through a bed or column of the clay is of use. Of course, good contact between the clay and solution is recommended.

The clay is then separated (any separation technique serves, e.g., filtration, decantation, centrifugation and like mechanical expedients ) and sodium carbonate crystallized from the clay treated sodium carbonate solution. Choice of a specific crystallization technique is wide since the clay treatment is effective regardless of the specific carbonation or crystallization.

It is usually preferable, however, to conduct the crystallization to form sodium carbonate monohydrate crystals. This crystallization is effected while the temperature of the clay treated, carbonated cell liquor is at temperatures at which monohydrate is the stable solid form of sodium carbonate in equilibrium with aqueous sodium carbonate solution. Seidell, Atherton, Solubility of Inorganic and Metal Organic Compounds, Third Edition, Vol. 1, p. 1193 and U.S. Pat. No. 2,133,455 granted May 7, 1963 provide tables showing the temperatures at which the monohydrate is the stable form taking into account the NaCl content. These are temperatures which may be used. After separation, as by filtration, these monohydrate crystals can be dried (by means known to the art) to remove water of hydration to produce soda ash ($Na_2CO_3$) with no water of hydration.

Conditions for performing the clay treatment step are quite flexible. Temperatures may range from as low as 0° C. more usually at least 20° or 25° C., up to about 8° C. or 95° C. In one particular procedure a temperature in the upper portion of this range, e.g., about 70° to 85° C. has proven convenient. Beneficial effects are observed with quite small quantities of clay, a typical minimum of attapulgite clay being about 10 pounds of clay per ton of solid sodium carbonate product ($Na_2CO_3$ basis). Although, larger amounts impart beneficial effects, economics do not justify clay quantities much greater than 50 or 75 pounds of attapulgite type clay per ton of product (on a $Na_2CO_3$ basis).

In general, the period and conditions of contact between the carbonated cell liquor solution and clay are chosen to insure good contact. One or two minutes give beneficial results, although more practical contact periods are from about 15 minutes to 60 or even 120 minutes. Agitation also is useful to enhance contact.

As used and intended herein, the term attapulgite type clay refers to mineral clays such as attapulgite itself as well as other clays which exhibit the identifying open channel needlelike structure characteristic of attapulgite clay. Attapulgite clays are magnesium aluminum silicate minerals containing a significant magnesium concentration and structurally are inosilicates which give rise to a fibrous or needle particle shape. Sepiolite is illustrative of an attapulgite type clay (other than attapulgite). It has an open channel needle structure virtually identical to that of attapulgite differing primarily from attapulgite in having a lower aluminum concentration below about 2 percent aluminum by weight. Attapulgite type clays are those which effectively treat aqueous sodium carbonate solutions.

The following examples illustrate the manner in which the present invention may be practiced:

EXAMPLE 1

A battery jar was filled with 16,000 grams of carbonated cell liquor. Sufficient sodium bicarbonate (approximately 57 grams) was added to neutralize a small amount of the sodium hydroxide remaining after carbonation of the cell liquor. The solution was then established at the specified temperature (as stated in Table 2) and attapulgite type clay (type and amount as specified in Table 2) was added. After stirring well for the given period of time, the solution was filtered using a glass fiber filter and the filtrate charged to a crystallizer comprised of a 5-liter stainless steel kettle equipped with a feed metering pump, vacuum evaporating system, heating mantle, thermowell, and paddle type stirrer. Sufficient sodium chloride and water was mixed with this filtrate to provide the compositions listed in Table 1.

After heating the charge in the kettle crystallizer to 91° to 92° C., the solution was seeded with 50 grams of sodium carbonate monohydrate and feed of the sodium carbonate solution (compositions as specified in Table 1) was commenced at the rate of 1,440 milliliters per hour while evaporation was effected at the rate of 440 to 470 milliliters water per hour. Hourly, accumulated mother liquor was withdrawn from the crystallizer in one-liter quantities. Samples of the sodium carbonate monohydrate crystals were withdrawn from the crystallizer via a suction tube into a funnel equipped with a fritted glass filter.

Samples of the so filtered sodium carbonate monohydrate crystals were dried in a rotary evaporator, photomicrographed, screened and measured microscopically.

Compositions of the aqueous crystallizer feed and the mother liquor (by calculation) were as follows:

TABLE 1

| | Composition, Weight % | |
|---|---|---|
| | Feed | Mother Liquor |
| $Na_2CO_3$ | 13.73–14.87 | 11–12 |
| $NaHCO_3$ | 0.02–0.07 | — |
| NaCl | 13.18 | 20–21 |
| $Na_2SO_4$ | 0.4 | 0.6 |
| $NaClO_3$ | 0.02 | 0.02 |

Table 2 lists the various conditions of treatment and the results there obtained:

TABLE 2

| Clay | Treatment conditions | | | Sample time,[1] hours | Ratio of crystal dimention[2] of minus 30 to plus 50 mesh fraction, c:a:b |
|---|---|---|---|---|---|
| | Amount clay, lbs. per ton $Na_2CO_3$ | Temperature, °C. | Time, hour | | |
| A | 50 | 25 | 1.0 | 6.3 | 1:1.0:3.2 |
| | 50 | 35–40 | 1.0 | 5.5 | 1:1.0:4.0 |
| B | 50 | 35–40 | 1.0 | 6.6 | 1:1.0:3.1 |
| | 25 | 47–53 | 1.0 | 3.6 | 1:1.0:2.7 |
| | 25 | 78–82 | 1.0 | 4.7 | 1:0.50:1.4 |
| | 25 | 78–82 | 0.5 | 2.8 | 1:0.69:1.9 |
| | 25 | 78–82 | 0.25 | 5.4 | 1:0.62:1.9 |
| | 12.5 | 78–82 | 1.0 | 4.9 | 1:1.0:3.5 |
| | 12.5 | 78–82 | 0.5 | 4.9 | 1:1.1:4.2 |
| C | | | | | 1:2.2:9.9 |

[1] Time which had elapsed after crystallizer commenced operation when sample taken.
[2] As measured microscopically.
NOTE:
  A—Attapulgus clay supplied by Minerals and Chemicals Phillip Corp.
  B—Attapulgite supplied by Milwhite.
  C—No clay treatment.

Data in Table 2 show that with a variety of treatment conditions and using attapulgite type clays considerably more compact sodium carbonate monohydrate crystals are obtained than when there is no clay treatment. Comparison of the ratio of the "c" axis of the crystal to its "b" axis emphasizes this crystal compactness. Without the clay treatment, the monohydrate crystals' "b" axis was approximately 10 times greater than the "c" axis. Clay treatments reduced the "b" axis downwardly to on the order of about 1 to 4 times that of the "c" axis.

According to a further embodiment of this invention, the clay treatment is effected on a carbonated cell liquor which is substantially free of sodium hydroxide, and preferably with a carbonate liquor containing at least a minor amount, for example, from 0.1 percent to 2.0 percent, relay more than 5 percent sodium bicarbonate by weight of the solution.

EXAMPLE 2

Following substantially the procedure and using the equipment as described in Example 1, aqueous sodium carbonate solutions containing differing amounts (as set forth in Table 3) of sodium hydroxide and sodium bicarbonate were treated for 1 hour at 25° C. with a quantity of attapulgus clay equivalent to 50 pounds clay per ton of product ($Na_2CO_3$ basis) and the sodium carbonate crystals thereby provided were separated and handled by the procedure described in Example 1. Table 3 lists the results.

TABLE 3

| Run number | Weight percent NaHCO₃ | Weight percent NaOH | Clay treated | Sample¹ time, hours | Ratio of crystal dimensions of minus 30 to plus 50 mesh fraction, c:a:b |
|---|---|---|---|---|---|
| 1 | 0.35–0.50 | | No | 5.0 | 1:1.4:4.9 |
| 2 | 0.35–0.50 | | Yes | 5.4 | 1:0.27:0.85 |
| 3 | 0.1 | | No | 6.0 | 1:3.4:13 |
| 4 | 0 | 0 | No | 6.6 | 1:3.7:12 |
| 5 | 0 | 0 | Yes | 6.3 | 1:1.0:3.2 |
| 6 | 0 | 0.1–0.2 | No | 6.1 | 1:2.2:8.2 |
| 7 | 0 | 0.1–0.2 | Yes | 6.7 | 1:2.8:8.6 |

¹ Time which had elapsed after crystallizer commenced operation when sample taken.

In runs 1 and 2 of Table 3, the typical specific compositions of the feed to, and mother liquor in the crystallizer were:

| Component | Weight Percent Feed | Mother Liquor |
|---|---|---|
| NaCl | 11.9 | 20.0 |
| Na₂CO₃ | 13.5 | 10.0 |
| NaHCO₃ | 0.50 | 0.35 |
| Na₂SO₄ | 0.36 | 0.27 |
| NaClO₃ | 0.01 | 0.01 |

For runs 6 and 7, typical specific compositions of this feed and mother liquor were:

| Component | Weight Percent Feed | Mother liquor |
|---|---|---|
| NaCl | 13.4 | 20.0 |
| Na₂CO₃ | 13.55 | 11.6 |
| NaOH | 0.16 | 0.14 |
| Na₂SO₄ | 0.44 | 0.4 |
| NaClO₃ | 0.017 | 0.01 |

Runs 1, 2 and 5 illustrate the desirability of treating a carbonate solution containing sodium bicarbonate. When the sodium carbonate solution contained sodium hydroxide (as when carbonation was incomplete) the clay treatment was less effective, compare runs 4 and 7.

These examples illustrate practice of this invention with respect to carbonated cell liquors of particular composition, but the principles apply to carbonated cell liquors of other compositions. For example, the treatment is effective whether or not the carbonated cell liquor contains more or less sodium chloride, sodium sulfate and/or sodium chlorate. Sodium carbonate solutions with sodium carbonate contents ranging upwards of 1 percent by weight to saturation may be clay treated.

It is to be appreciated that as a practical matter the precise composition of the sodium carbonate solution contacted with the clay, more often than not is dictated by the relationship of the solution to other steps involved in preparing the solid sodium carbonate product. For example, the sodium chloride content might well be chosen to accommodate a desired sodium chloride concentration for a step subsequent to the clay treatment, e.g., the crystallization step. So too, the sodium carbonate solutions are apt to be of concentrations consistent with minimizing the water evaporation burden imposed upon the evaporative crystallization.

After the clay treatment, sodium carbonate is removed as solid from solution (crystallized out) preferably as sodium carbonate monohydrate. The advantageous crystal structure of this product is carried over to sodium carbonate produced by drying of this monohydrate. Alternatively, by crystallizing at appropriate higher temperatures, (e.g., temperatures above the transition temperature for the monohydrate to unhydrated form taking into account the effect sodium chloride has on this temperature) the crystallized product can be unhydrated sodium carbonate.

According to a further embodiment of this invention, the treatment to remove the adverse effect (or reduce effectively to a tolerable level) of the organic impurity is achieved by contacting the cell liquor or carbonated cell liquor with a compound of a group II A metal. In particular, it has been found that magnesium compounds are especially effective.

The following examples illustrate the use of magnesium chloride to improve the crystal habit of sodium carbonate monohydrate.

EXAMPLE 3

Using the equipment and following the general procedure described in Example 1, the battery jar was filled with carbonated cell liquor of the composition:

| | Weight Percent |
|---|---|
| NaCl | 15.2 |
| Na₂CO₃ | 10.9 |
| NaOH | 0.01 |
| Na₂SO₄ | 0.40 |
| NaClO₃ | 0.008 |

This composition was then heated to 25° C. or 80° C. (as indicated in the following tabulation of results) and an aqueous solution of magnesium chloride (30 weight percent $MgCl_2$) was added. After 30 minutes, the treated solution was filtered through a glass fiber filter in a Buchner funnel. A portion of the filtrate composition was adjusted by adding sodium carbonate and 3,500 grams of the resulting solution was diluted to 4,000 grams of solution containing 20 percent NaCl and 11.6 percent $Na_2CO_3$ by weight. This solution simulated crystallizer mother liquor and was charged to the kettle crystallizer and then heated to 91°–92° C. Fifty grams of sodium carbonate monohydrate were added as seed, and vacuum evaporative crystallization commenced. Feed of filtrate was at the rate of 1,200 milliliters per hour while the evaporation rate was 320 milliliters per hour.

These results were obtained:

| Run Number | MgCl₂ treatment Pounds/ton Na₂CO₃ | MgCl₂ treatment Temperature, °C | Sample time, hours | Ratio of crystal dimensions 30/50 mesh fraction, c:a:b |
|---|---|---|---|---|
| 1 | 0 | | 3.8 | 1:1.3:5.0 |
| 2 | 2.6 | 25 | 5.3 | 1:0.74:24 |
| 3 | 0.8 | 80 | 5.4 | 1:0.72:2.1 |

EXAMPLE 4

The procedure of Example 3 was followed with the exception that the carbonated cell liquor composition was:

| | Weight Percent |
|---|---|
| NaCl | 16.4 |
| Na₂CO₃ | 12.5 |
| NaHCO₃ | 0.15 |
| Na₂SO₄ | 0.44 |
| NaClO₃ | 0.012 |

The evaporation rate was 220 milliliters per hour.
The obtained results were:

| Run Number | MgCl₂ treatment | | Sample time, hours | Ratio of crystal dimensions 30/50 mesh fraction, c:a:b |
| --- | --- | --- | --- | --- |
| | Pounds/ton Na₂CO₃ | Temperature, °C. | | |
| 1 | 0 | | 4.2 | 1:1.6:6.3 |
| 2 | 2.2 | 80 | 4.9 | 1:0.47:1.3 |

EXAMPLE 5

Example 3 was repeated except that the crystallizer feed rate was 600 milliliters per hour and the evaporation rate 200 milliliters per hour. The carbonated cell liquor composition was:

| | Weight Percent |
| --- | --- |
| NaCl | 14.1 |
| Na₂CO₃ | 15.8 |
| NaOH | 0.15 |
| Na₂SO₄ | 0.96 |
| NaClO₃ | 0.036 |

These results were:

| Run Number | MgCl₂ treatment | | Sample time, hours | Ratio of crystal dimensions 30/50 mesh fraction, c:a:b |
| --- | --- | --- | --- | --- |
| | Pounds/ton Na₂CO₃ | Temperature, °C. | | |
| 1 | 0 | | 5.2 | 1:1.6:6.0 |
| 2 | 7.6 | 80 | 4.9 | 1:0.78:2.4 |

EXAMPLE 6

A magnesium chloride solution (25 or 30 weight percent MgCl₂) was diluted with water to 2–5 weight percent MgCl₂ content. This was then added to cell liquor which was at 80° C. and the mixture stored for 30 minutes following which it was filtered to remove the insoluble magnesium compound present.

This filtrate was then carbonated with CO₂ (either bubbling gas or adding dry ice through the solution) until the solution reached a pH of about 11 and the carbonated solution analyzed. A 3,500 gram portion of so carbonated solution which was adjusted to a 4,000 gram portion having a 20 percent NaCl and 11.6 percent Na₂CO₃ content by weight was charged to the crystallizer described in Example 1 to simulate mother liquor. Varying amounts of seed and evaporation were used. The feed rate was 20 milliliters per minute.

These carbonated cell liquor feed compositions were used:

| Constituent Wt.% | Feed A | Feed B | Feed C |
| --- | --- | --- | --- |
| NaCl | 14.9 | 15.6–16.7 | 14.1–14.7 |
| Na₂CO₃ | 12.1 | 12.4–13.4 | 12.7–13.7 |
| NaHCO₃ | 0.20 | 0.14–0.48 | 0.18–0.38 |
| Na₂SO₄ | 0.46 | 0.46–0.48 | 0.42 |
| NaClO₃ | 0.01 | 0.012–0.013 | 0.01 |

These results were obtained:

| Run number | Feed | Treatment, MgCl₂* | Sample time, hours | Ratio of axis dimensions 30/50 mesh fraction, c:a:b |
| --- | --- | --- | --- | --- |
| 1 | A | 2.4 | 5.9 | 1:1.1:2.8 |
| 2 | B | | 3.0 | 1:1.7:4.3 |
| 3 | B | 0.78 | 4.9 | 1:0.39:1.0 |
| 4 | B | 0.48 | 5.3 | 1:1.3:4.8 |
| 5 | C | | 4.8 | 1:1.6:5.8 |
| 6 | C | 10 | 4.2 | 1:0.35:0.79 |

*Pounds per ton of product (Na₂CO₃ basis).

In Run 1, the feed rate to the crystallizer was 0.54 liters per hour and 50 grams of sodium carbonate monohydrate was added to the initial crystallizer charge as seed. For Runs 2, 3 and 4 the evaporation rate was 0.21 liters per hour and the amount of seed was the same as in Run 1. For Runs 5 and 6, only 10 grams of seed was used and the evaporation rate was 0.35 liters per hour.

In examples 3, 4, 5 and 6 it may well be that the effective form of the magnesium compound is that of the compound formed in situ. For example, the presence of northupite (magnesium sodium carbonate with chloride) has been observed. Also, hydrolysis of the magnesium chloride can take place to provide magnesium hydroxide. Magnesium hydroxide can be used effectively.

As these Examples 3 through 6 demonstrate, treatment with a magnesium compound of carbonated cell liquor with or without sodium hydroxide prior to crystallization is effective. Contrasted with attapulgite clay treatment which achieves good results when the carbonated cell liquor (sodium carbonate solutions) is free of NaOH, and even better results when some sodium bicarbonate is present the treatment with magnesium compound is effective whether used to treat cell liquor prior or subsequent to carbonation.

Compounds of other group II A metals can be used. Group II A metals include calcium, strontium and barium as well as magnesium.

The use of a group II A metal other than magnesium is illustrated by this example.

EXAMPLE 7

Ten kilograms of cell liquor was heated to 80° C. and 21 grams of barium chloride (as a 21 weight percent aqueous solution) per 1,000 grams of cell liquor was stirred into the cell liquor. After 30 minutes of stirring, the solution was filtered and then carbonated with gaseous carbon dioxide. The precipitate which formed on cooling was filtered.

A 3,000 gram portion of the filtrate was used to prepare the initial crystallizer charge of 4,000 grams containing 20.9 percent NaCl and 11.6 percent Na₂CO₃. Thereafter, the filtrate (containing 14.49 percent NaCl and 13.21 percent Na₂CO₃ by weight) was fed to the crystallizer (described in Example 1) at the rate of 20 milliliters per minute while evaporation was 0.32 liters per hour.

The treated material provided sodium carbonate monohydrate crystals with a $c : a : b$ ratio of crystal dimensions for its minus 30 to plus 50 mesh fraction of 1:1.2:4.5 contrasted to 1:2.4:8.3 ratio obtained with no barium chloride treatment but the same carbonated cell liquor.

Those conditions of treatment (e.g., time of contact and temperature) described with respect to the treatment with clay are applicable to treatment with compounds of group II A. As little as about 0.1 of a pound of a magnesium compound per ton of product produces desirable effects. Larger amounts are useful; rarely would economics justify using more than 25 pounds per ton.

Alkali metal carbonates other than sodium carbonate, for example, potassium carbonate and lithium carbonate may be treated pursuant to this invention. Thus, the treatment may be applied to carbonated cell liquor of an electrolytic cell which is fed potassium chloride (rather than sodium chloride), e.g., potassium hydroxide cell liquors.

Moreover, although the invention is described with respect to treatment of carbonated cell liquors, it is obvious the treatment is effective in overcoming the effects caused by the organics in question regardless of their source.

While the present invention has been described with respect to specific details of certain embodiments it is not intended that it be construed as limited to such details except and to the extent that such details are set forth in the hereto appended claims.

We claim:

1. A method of preparing alkali metal carbonate from carbonated aqueous alkali metal hydroxide cell liquor prepared by electrolysis of alkali metal chloride in an electrolytic cell comprising contacting the carbonated cell liquor with attapulgite type clay, separating the clay, and thereafter crystallizing alkali metal carbonate from the so-treated cell liquor.

2. The method of claim 1 wherein the alkali metal carbonate is sodium carbonate.

3. The method of claim 2 wherein sodium carbonate monohydrate is crystallized.

4. A method of preparing sodium carbonate monohydrate which comprises carbonating aqueous sodium hydroxide cell liquor prepared by electrolysis of sodium chloride in an electrolytic cell to produce a sodium carbonate solution, contacting the solution with attapulgite clay, separating the clay and thereafter crystallizing sodium carbonate monohydrate from the solution.

5. The method of claim 4 wherein the sodium carbonate solution contacted by clay contains a minor concentration of sodium bicarbonate.

6. The method of claim 5 wherein the sodium bicarbonate concentration is from 0.1 to 2.0 weight percent of the solution.

* * * * *